United States Patent [19]
Miller et al.

[11] Patent Number: 5,315,516
[45] Date of Patent: May 24, 1994

[54] PROCESS AND SYSTEM FOR GENERATING A SIGNAL REPRESENTATIVE OF THE TRANSVERSE MOVEMENT OF A VEHICLE

[75] Inventors: Bernhard Miller, Stuttgart; Stefan Gorny, Schwieberdingen; Rainer Kallenbach, Waiblingen-Neustadt; Andreas Klug, Stuttgart, all of Fed. Rep. of Germany

[73] Assignee: Robert Bosch GmbH, Stuttgart-Feuerbach, Fed. Rep. of Germany

[21] Appl. No.: 968,294

[22] Filed: Oct. 29, 1992

[30] Foreign Application Priority Data

Dec. 6, 1991 [DE] Fed. Rep. of Germany ....... 4140239

[51] Int. Cl.$^5$ ............................................. B60T 8/32
[52] U.S. Cl. ........................... 364/424.01; 364/426.02; 180/197
[58] Field of Search ...................... 364/424.07, 426.02; 303/100, 102, 110; 180/178, 197

[56] References Cited

U.S. PATENT DOCUMENTS

| 4,647,115 | 3/1987 | Leiber et al. | 303/106 |
| 4,758,053 | 7/1988 | Yasuno | 303/91 |
| 4,849,891 | 7/1989 | Krohn et al. | 364/426.03 |
| 4,902,076 | 2/1990 | Ushijima et al. | 303/100 |
| 4,932,726 | 6/1990 | Iwata et al. | 303/100 |
| 5,005,132 | 4/1991 | Yoshino | 364/426.02 |
| 5,072,803 | 12/1991 | Kilian et al. | 180/141 |
| 5,124,921 | 6/1992 | Jonner | 364/426.01 |
| 5,157,611 | 10/1992 | Ikeda et al. | 364/426.02 |
| 5,172,318 | 12/1992 | Meissner et al. | 364/426.02 |
| 5,183,128 | 2/1993 | Ito et al. | 180/197 |
| 5,208,755 | 5/1993 | Tezuka | 364/426.03 |

FOREIGN PATENT DOCUMENTS

| 0353995 | 3/1990 | European Pat. Off. |
| 3827737 | 3/1989 | Fed. Rep. of Germany |
| 3930445 | 3/1990 | Fed. Rep. of Germany |

*Primary Examiner*—Thomas G. Black
*Assistant Examiner*—Tan Q. Nguyen
*Attorney, Agent, or Firm*—Baker & Daniels

[57] ABSTRACT

Signals delta_w representing the RPM difference of at least two wheels of at least one axle and signals V representing the vehicle speed are linked through a nonlinear characteristic diagram. Obtained thereby are signals which represent the transverse movements, specifically the transverse acceleration, of the vehicle. This makes it possible to allow for nonlinear effects such as the expansive deflection of the curve inside tires and the compressive deflection of the curve outside tires due to the roll moment backing, particularly through empirically determined parameters. The signal of the stationary transverse acceleration is dynamized by further processing, in a second order filter, of the signal of the stationary transverse acceleration (steering angle is constant) so obtained.

8 Claims, 3 Drawing Sheets

PROCESS AND SYSTEM FOR GENERATING A SIGNAL REPRESENTATIVE OF THE TRANSVERSE MOVEMENT OF A VEHICLE

BACKGROUND OF THE INVENTION

The present invention relates to a method and system for generating a signal representative of the transverse movement of a vehicle, utilizing the RPM of at least two wheels of at least one axle.

The maximally accurate knowledge of the movements of a vehicle is of elementary significance for any type of control or regulation which counteracts these movements in the sense of increasing the travel comfort and road safety.

Such a counteraction can be accomplished, as described in DE-OS 35 29 178, by an active suspension and/or damping system whose suspension and/or damping performance is of a controllable or regulable configuration.

Furthermore, such influencing of the vehicle movements may be effected by controllable or regulable allocation of force to the individual drive wheels and/or by controllable or regulable steering operations. In exemplary fashion, reference is made in this context to a prior propulsion control system (PCT/EP89/00953) and to a curve recognition procedure in the context of an antilock control system (DE-OS 37 39 558). A process for steering control is proposed in DE-OS 39 30 445.

The causes of the vehicle movements are essentially acceleration and/or braking operations, steering operations and/or road surface unevennesses.

Important measured quantities representing the travel dynamics, particularly the transverse dynamics of the vehicle, and representing essential input variables of the control or regulation systems described above are the steering angle, or the transverse acceleration of the vehicle causally associated with the steering angle. Meant by steering angle is here the swing angle of the steerable wheels.

The steering angle, respectively the transverse acceleration of the vehicle, can be measured either "directly" by suitable sensors (steering angle sensors or acceleration sensors) or can be derived indirectly from other sensor signals. In view of minimizing the number of sensor systems, the "indirect" measuring methods should be given preference over the "direct" methods.

EP-OS 0353 995 describes a steering angle detector system where the steering angle is determined from the wheel RPM, or wheel frequencies, which differ in steering operations.

Exactly the maximally accurate determination of the transverse movements of a vehicle, for instance of the transverse acceleration, is of major importance for an optimum design of a chassis system and/or steering system.

It is known to provide a system for evaluation of wheel speed signals where the wheel speed difference is determined at minimal components expense. Moreover, it is proposed in such a system to determine the transverse acceleration of the vehicle in proportion to the vehicle speed and to the wheel speed difference. This has been proved as not being optimal.

The problem underlying the present invention is to determine a signal based on the wheel speed differences, which signal optimally represents the transverse movement of the vehicle, especially the transverse acceleration.

SUMMARY OF THE INVENTION

The present invention provides a method and system for determining a first signal representing the transverse movement of the vehicle using a given characteristic diagram from second signals representing the RPM differences of at least two wheels, and from third signals V representing the vehicle speed.

The inventional process is based on signals delta_w representing the wheel speed difference of at least two wheels of at least one axle, and on signals V representing the vehicle speed. Through linkage of these signals by a nonlinear characteristic diagram there are signals obtained which represent the transverse movements, specifically the transverse acceleration, of the vehicle.

The inventional process has the advantage that by allowing for the nonlinear correlations between the transverse acceleration and the wheel speed difference, for one, and the vehicle speed, for another, it is possible to make allowance, e.g., for the tire deflection attributable to the roll moment backing in curve travel.

Moreover, the inventional process has the advantage that the transverse acceleration remains steady at changing vehicle speed. Specifically, the amplification factor between the signal $aq_{00}$ representing the transverse acceleration and the signal delta_w representing the wheel speed difference can be stored as a nonlinear characteristic curve over the speed.

The nonlinear effects, such as the expansive deflection of the curve inside tires and the compressive deflection of the curve outside tires, due to the roll moment backing, can be allowed for, specifically by empirically determined parameters. Furthermore, the process can be applied empirically to any vehicle.

A favorable embodiment of the inventional system provides for processing the signal $aq_{00}$, captured as described above, in a second order filter. This offers the advantage that the signal $aq_{00}$, which descr the transverse acceleration of the vehicle in stationary curve travel (steering angle is constant), is dynamized in the second order filter. Here, the speed dependence of the dynamics can be allowed for by filter coefficients which are switchable in contingence on the vehicle speed.

Advantageous is the use of the signals $aq_{00}$ and/or aq determined by the inventional process for chassis control and/or actuation of a steering system.

An object of the invention is also a device for the application of the inventional process, where first means I3 are provided with the aid of which from a stored nonlinear characteristic curve a first signal $aq_{00}$ is determined from second signals delta_w representing the speed difference of at least two wheels and from third signals V representing the vehicle speed.

Furthermore, a further embodiment provides for second means 14 with the transfer performance of a second order filter, by means of which the first signals $aq_{00}$ are processed.

BRIEF DESCRIPTION OF THE DRAWINGS

An embodiment of the inventional process, or inventional device, will be described hereafter with the aid of FIG. 1, 2 and 3 in which.

DETAILED DESCRIPTION OF THE INVENTION

Figure 1:
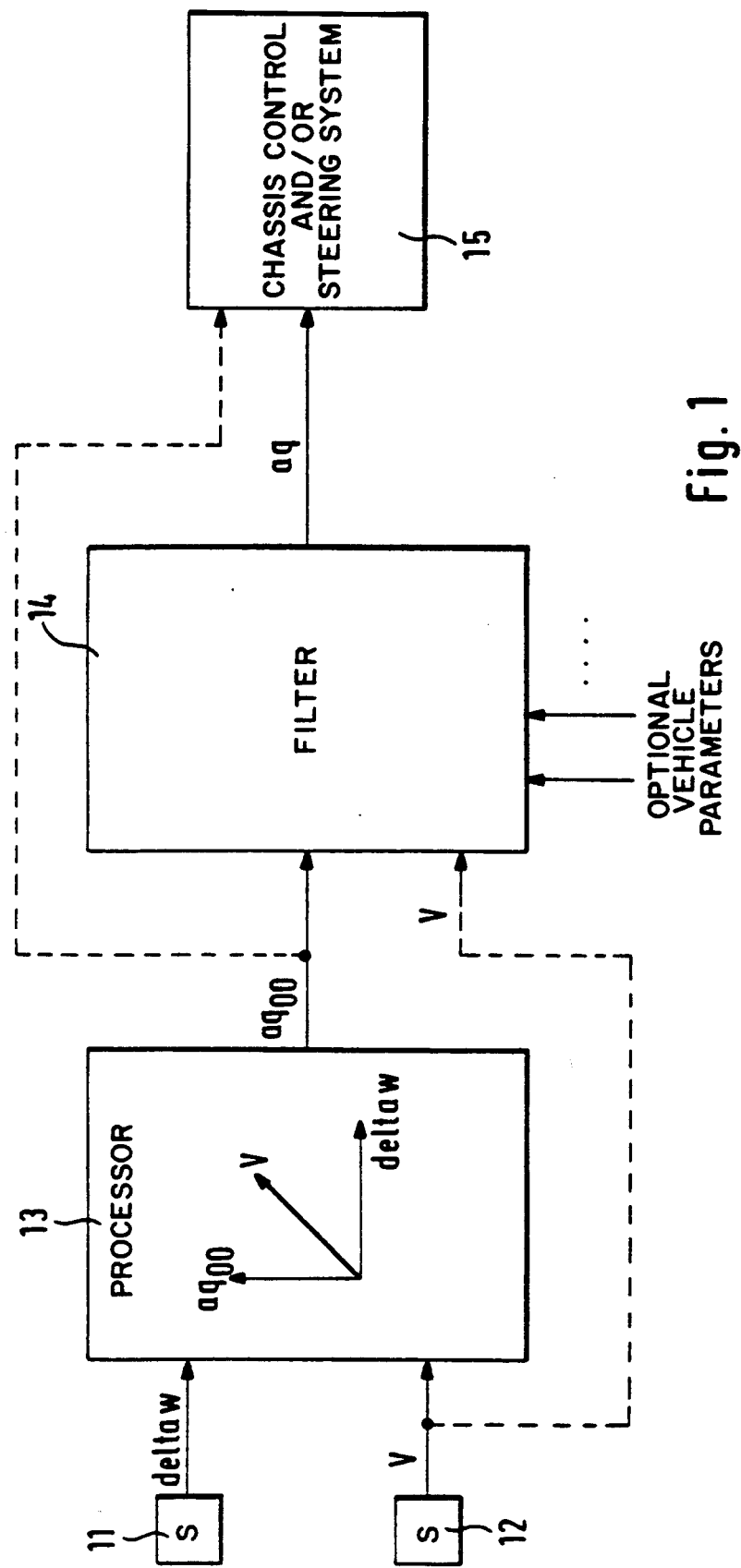
FIGS. 1 and 2 illustrate block diagrams of the method and system of the present invention.
Figure 2:
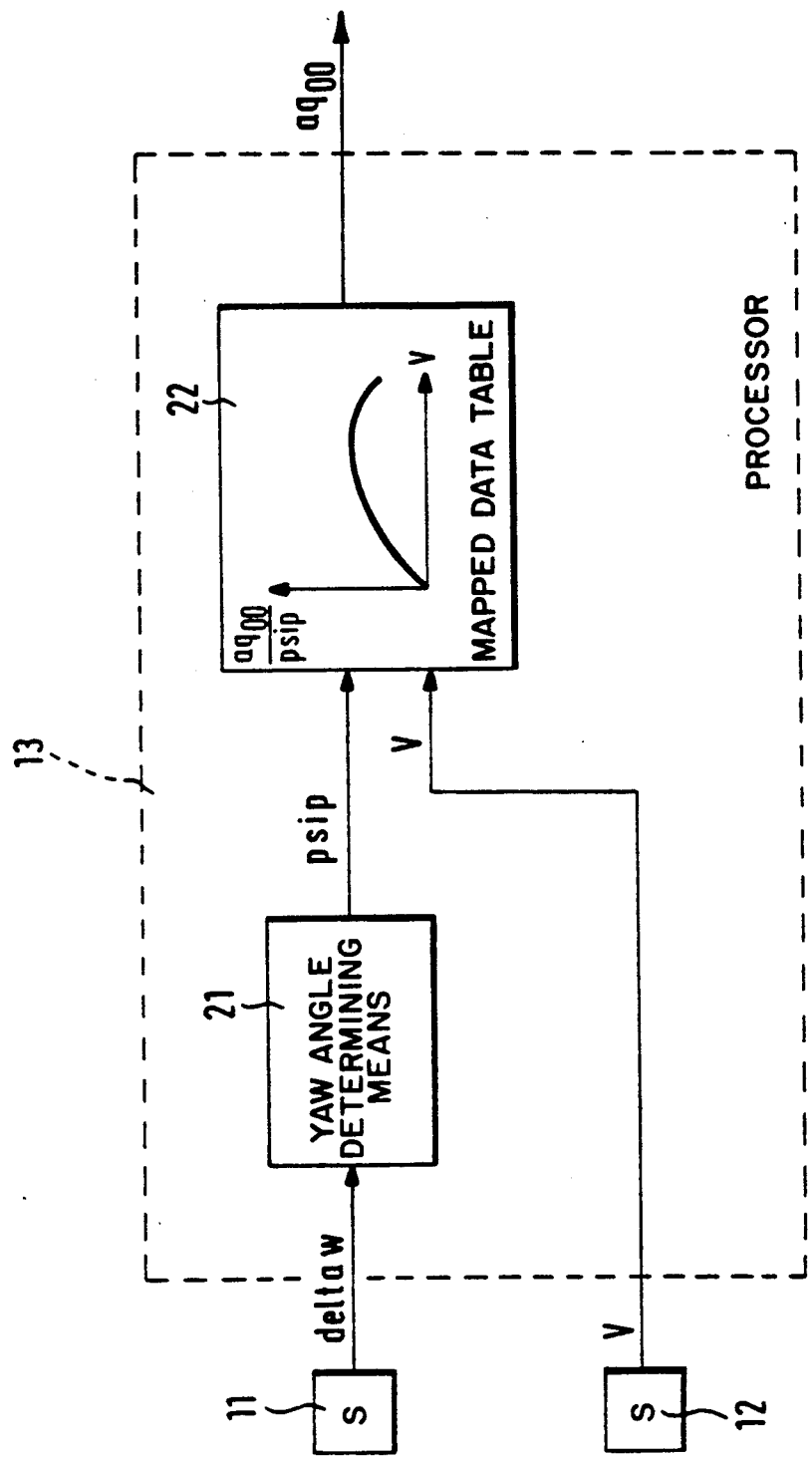
Figure 3:
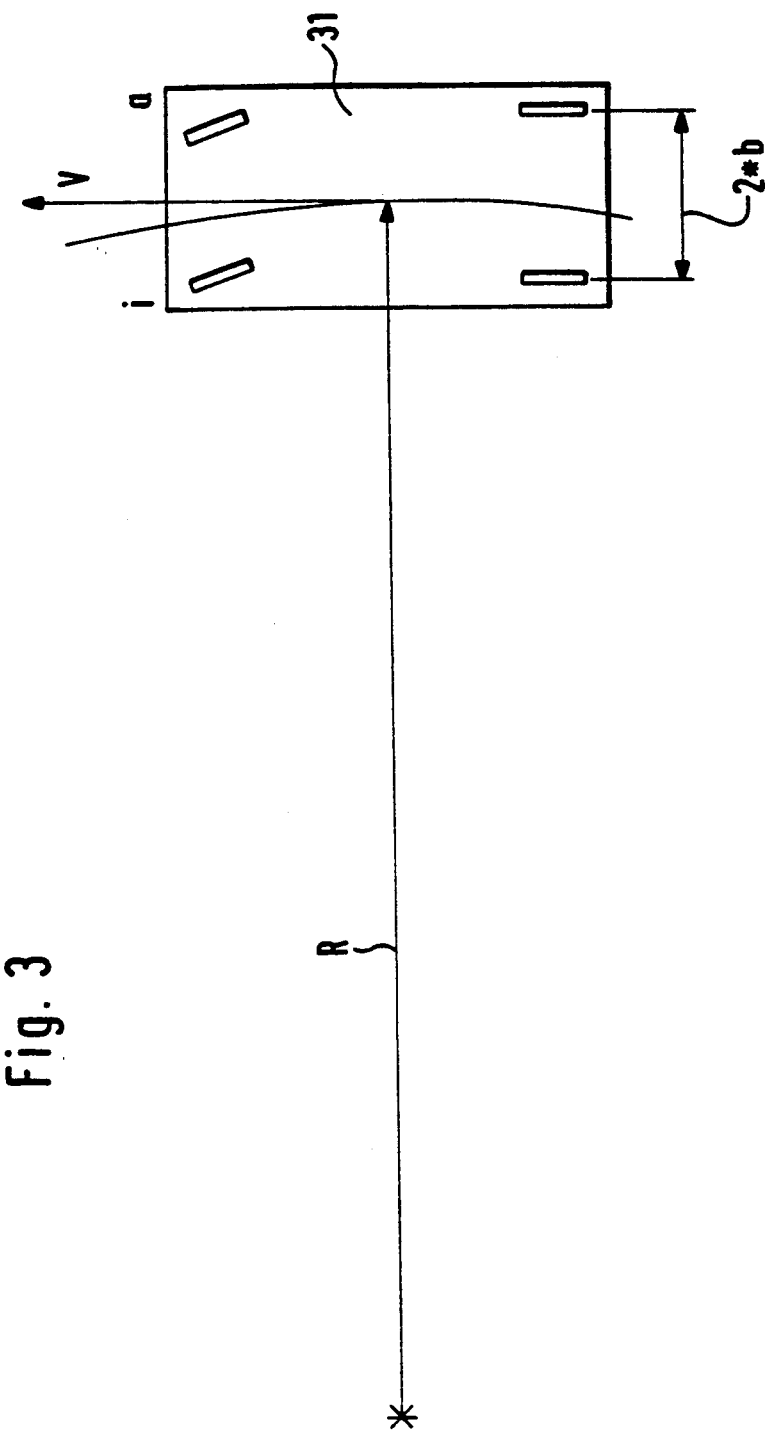
FIG. 3 illustrates general principles.

Before addressing the embodiment with the aid of FIG. 1 and 2, several general explanations shall be given first with the aid of FIG. 3.

The speed difference of the wheels of an axle of a two-track vehicle 31 is in first approximation proportional to the yaw velocity psip, that is, to the speed of rotation about the vertical axis of the vehicle. The yaw velocity psip occurs in curve travel and correlates to the vehicle speed V and the curve radius R (FIG. 3) as follows:

$$psip = V/R \quad (1)$$

In the case of curve travel free of lateral force, that is, at disappearing king pin inclinations, the outside wheels roll on a circular arc with the radius R+b at the turning circle frequency $$omega\_a = 1/r * [psip*(R+b)] \quad (2)$$

while the inside wheels run on a circular arc with the radius R-b at the turning circle frequency $$omega\_i = 1/r * [psip*(R-b)] \quad (3)$$

where R is the roll radius of the wheels and 2*b signifies the track of the wheels of an axle.

Deriving as difference frequency delta_w between the turning circle frequencies of the curve outside and curve inside wheels is $$delta\_w = omega\_a - omega\_i = 2/r * [psip*b] \quad (4)$$

Thus, the yaw angle velocity psip is $$psip = [r/(2*b)] * delta\_w \quad (5)$$

Known from the prior art (Zomotor, A.: Fahrwerktechnik: Fahrverhalten [Chassis engineering: Travel performance], Würzburg, Vogel-Buchverlag, 1987) is the linear single-track model for the transverse dynamics of a vehicle. Deriving thereof for the transverse acceleration aq is $$aq = (psip + betap) * V \quad (6),$$

where V is the vehicle speed and betap is the time derivation of the floating angle. This establishes the correlation between the steering angle delta and the yaw angle velocity psip, or the floating angle velocity betap, by the transfer functions $$G_{psip}(s) = Z_{psip}(s)/N(s) = psip(s)/delta(s) \quad (7)$$

or $$betap(s) = Z_{betap}(s)/N(s) = betap(s)/delta(s) \quad (8)$$

where s signifies the Laplace variable. Both transfer functions $G_{psip}(s)$ and $G_{betap}(s)$ differ obviously only by their numerator polynomial $Z_{psip}(s)$, respectively $Z_{betap}(s)$, while the denominator polynomial N(s) is in both cases the characteristic polynomial of the single track model.

Inserting equations (7) and (8) in equation (6) returns for the transfer function between the transverse acceleration aq and the yaw angle velocity psip $$\begin{aligned} aq(s)/psip(s) &= [1 + betap(s)/psip(s)] * V \\ &= [1 + Z_{betap}(s)/Z_{psip}(s)] * V \\ &= 1/Z_{psip}(s) * [Z_{psip}(s) + Z_{betap}(s)] * V. \end{aligned} \quad (9)$$

The denominator order of the transfer function being one but the numerator order being 2, an additional pole needs to be inserted as a filter for the mathematical realization of equation (9). The amplification and dynamics are dependent on vehicle parameters and on the vehicle speed.

Basing on the frequency difference between the curve inside and curve outside wheel, the yaw angle velocity psip can now be calculated using equation (5). Since in the case of a stationary curve travel, where the steering angle delta is constant, the floating angle velocity betap is zero [transfer function (8) has differentiating character], the static transverse acceleration $aq_{\infty}$ in stationary curve travel is according to equations (5) and (6) directly proportional to the vehicle speed and the RPM difference delta_w $$aq_{\infty} = [r/(2*b)] * delta\_w * V \quad (10).$$

According to equation (10), as described in the prior art, a simple linear correlation is expected between the RPM difference delta_w, the vehicle speed V and the transverse acceleration aq to be determined.

But the simple linear correlation reproduces the transverse acceleration only insufficiently well. One reason is, e.g., that the tire deflections due to roll moment backing in curve travel remain unallowed for. The effect in curve travel is that the curve inside tires deflect expansively while the curve outside tires deflect compressively. As a superimposition on the difference frequency caused by the curve travel there occurs thus a difference frequency caused by a radius reduction or radius enlargement of the wheels due to the roll moment backing described above.

The nonlinear correlation between the transverse acceleration, the wheel speed difference and the vehicle speed is allowed for by empirically determined parameters, for instance in the form of a nonlinear characteristic diagram or a nonlinear characteristic curve. This makes it possible to adapt the determination of the transverse acceleration to any vehicle. This can be accomplished for example by equipping a vehicle of a series to which the procedure is to be applied, in addition to means for determining the wheel differences and the wheel speed, with transverse acceleration sensors. The aforementioned parameters are arrived at by measuring the transverse acceleration in traveling various curves at various vehicle speeds. In vehicles of same type without transverse acceleration sensors, these parameters can then be used to determine the transverse acceleration from the difference frequency and the vehicle speed.

Determined as described above, this value of the transverse acceleration corresponds to the static transverse acceleration $aq_{\infty}$, since the floating angle velocity betap [equations (6) and (8)] is zero only in stationary curve travel (steering angle delta is constant). The floating angle velocity betap differing from zero, in nonstationary curve travel (steering angle delta not constant), is to be allowed for according to equation (9). Deriving from equation (6) for the static value of the transverse acceleration $aq_{00}$, in the case of stationary curve travel (floating angle velocity betap is zero) is $$aq_{00} = psip * V \qquad (6).$$

Inserting this in equation (9) gives $$aq/aq_{00} = 1/Z_{psip}(s) * [Z_{psip}(s) + Z_{betap}(s)] \qquad (9').$$

Allowance for the not disappearing floating angle velocity betap in nonstationary curve travel can thus be made, according to equation (9'), by processing static acceleration $aq_{00}$ in a second order filter. Here, the speed dependence of the dynamics can be allowed for by filter coefficients switchable in contingence on travel speed.

FIG. 1 shows a block diagram of the embodiment. Referenced 11 and 12 are respective sensors "S" for capturing the wheel speed differences delta_w and the vehicle speed V. First means 13 are provided for processing the output signals of sensors 11 and 12. The output signals $aq_{00}$ of the first means 13 prevail on the input side of the second means 14. The output signals V of the means 12 are optionally passed to the second means. Beyond that, additional variables, specifically vehicle parameters, can be processed in the second means 14. Referenced 15 is a chassis control and/or steering system to which the output signals aq of the second means 14 and/or the output signals $aq_{00}$ of the first means 13 are transmitted.

The mode of operation of the embodiment will be described as follows:

The second signals delta_w representing the RPM differences of at least two wheels of at least one axle and the third signals V representing the vehicle speed are captured by means 11 and 12. Specifically, this can be accomplished by wheel speed sensors used with an antilock brake system (ABS). Known thereby are the RPM of the individual wheels as well as the mean RPM of several wheels, as vehicle speed.

Stored in the first means 13 are the parameters described above, which represent the nonlinear correlations between the transverse acceleration, the wheel speed difference and the vehicle speed. These may be stored in the form of a nonlinear characteristic diagram.

An embodiment of the first means 13 is illustrated in FIG. 2. Here, the second signals delta_w representing the RPM difference are relayed to means 21. The means 21 have the transfer performance described by equation (5), so that on the output side of the means 21 a signal psip is present which represents the yaw angle velocity in the case of stationary curve travel with a constant roll radius of the tires. The signal psip is linked with the signal V representing the vehicle speed by a nonlinear characteristic curve, resulting in the first signal $aq_{00}$ of the static transverse acceleration. The assumption here is that in the stationary case (steering angle is constant) the static transverse acceleration $aq_{00}$ is according to equation (5) proportional to the yaw angle velocity. Therefore, it is sufficient to store the nonlinear performance in the form of a nonlinear characteristic curve.

The aforementioned dynamization of the stationary value of the transverse acceleration takes place by processing the appropriate first signal $aq_{00}$ in the second means (FIG. 1), the transfer performance of which is described by equation (9'). Here, the speed dependence of the dynamics can be allowed for by filter coefficients switchable in contingence on travel speed, for which purpose the travel speed, in addition to other vehicle parameters, is optionally transmitted to the second means 14.

Present on the output side of the means 14 is thus the fourth signal aq representing the transverse acceleration of the vehicle. This signal aq can now be transmitted for processing to a system which influences the travel dynamics of the vehicle. Such systems are for instance chassis control or steering systems.

What is claimed is:

1. A method of generating a signal representative of transverse movement of a vehicle, comprising the steps of:
   determining respective speeds of rotating of a plurality of wheels, at least two of said wheels associated with an axle of the vehicle;
   generating a first signal representing a difference between said speeds of rotation of said at least two wheels;
   generating a second signal representing a speed of the vehicle;
   generating a third signal representing a static transverse acceleration of the vehicle, utilizing mapped data, dependent on said first and second signals; and
   processing said third signal in a second order filter having an output comprising a fourth signal representing a dynamic transverse acceleration of the vehicle, said fourth signal corresponding to said signal representative of said transverse movement.

2. A method according to claim 1, wherein said mapped data represents a nonlinear mathematical function.

3. A method according to claim 2, wherein said mapped data represents a nonlinear dependence between at least two of said first, second and third signals.

4. A method according to claim 2, wherein an amplification factor between the third signal representing the static transverse acceleration and the first signal representing the wheel speed difference is stored in said mapped data.

5. A method according to claim 1, wherein the second order filter has a transfer performance dependent on the vehicle speed.

6. A method according to claim 1, wherein the second order filter has a transfer performance dependent on at least one of filter coefficients and vehicle parameters, said filter coefficients and said vehicle parameters dependent on said second signal.

7. A method according to claim 1, wherein at least one of the third signal and the fourth signal is utilized for at least one of chassis control and actuation of a steering system.

8. A system for generating a signal representative of transverse movement of a vehicle, comprising:
   sensors for sensing respective speeds of rotation of a plurality of wheels, at least two of said wheels associated with an axle of the vehicle;
   means for generating a first signal representing a difference between said speeds of rotation of said at least two wheels;
   means for generating a second signal representing a speed of the vehicle;
   a processor for generating a third signal representing a static transverse acceleration of the vehicle, utilizing mapped data, dependent on said first and second signals; and
   a second order filter for processing said third signal, said filter having an output comprising a fourth signal representing a dynamic transverse acceleration of the vehicle, said fourth signal corresponding to said signal representative of said transverse movement.

* * * * *

UNITED STATES PATENT AND TRADEMARK OFFICE
CERTIFICATE OF CORRECTION

PATENT NO. : 5,315,516

DATED : May 24, 1994

INVENTOR(S) : Bernhard Miller, et al

It is certified that error appears in the above-identified patent and that said Letters Patent is hereby corrected as shown below:

Claim 1, column 6, line 11, change "rotating" to --rotation--.

Signed and Sealed this

Thirtieth Day of August, 1994

Attest:

Attesting Officer

BRUCE LEHMAN

Commissioner of Patents and Trademarks